United States Patent [19]

Carpenter

[11] Patent Number: 6,015,170
[45] Date of Patent: Jan. 18, 2000

[54] COUPLING ASSEMBLY

[76] Inventor: Rollow M. Carpenter, 1040 Peninsula Dr., Gallatin, Tenn. 37066

[21] Appl. No.: 08/977,444

[22] Filed: Nov. 26, 1997

[51] Int. Cl.[7] ..................................................... F16L 27/10
[52] U.S. Cl. ............................................ 285/223; 285/415
[58] Field of Search .................................... 285/337, 414, 285/415, 420, 223

[56] References Cited

U.S. PATENT DOCUMENTS

| | | | |
|---|---|---|---|
| 1,638,482 | 8/1927 | French et al. ............................ | 285/337 |
| 4,150,848 | 4/1979 | Dyrup ..................................... | 285/414 |
| 5,335,946 | 8/1994 | Dent et al. .............................. | 285/243 |

FOREIGN PATENT DOCUMENTS

| | | | |
|---|---|---|---|
| 624-054 | 9/1978 | U.S.S.R. ................................. | 285/223 |

OTHER PUBLICATIONS

2–pg. Product brochure for Uni–Flange® retainer gland, The Ford Meter Box Co., Inc., Wabash, IN.
2–pg. Product brochure for Flex–Tend® flexible expansion joint, EBBA Iron Sales, Inc., Eastland, TX.
2–pg. Product brochure for Flex 900 ball joint, EBBA Iron Sales, Inc., Eastland, TX.
1–pg. Photocopy showing Anchor or Swivel Coupling and Hydrant or Anchor Tee.

*Primary Examiner*—Anthony Knight
*Assistant Examiner*—Alison K. Pickard
*Attorney, Agent, or Firm*—Waddey & Patterson; Laura K. Thomas; Edward D. Lanquist, Jr.

[57] ABSTRACT

A coupling assembly for connecting components in a piping system comprising a conduit, an annular ring and a gland. The gland comprises a body and a flange portion extending radially therefrom. A circumferential groove is formed along an inner surface of the body, and the flange portion includes a plurality of spaced bores for enabling attachment of the gland to a mating component in the piping system. The gland preferably comprises two arcuate segments, each segment having bores formed in spaced apart ends thereof to enable the segments to be attached to one another. The annular ring includes a shoulder and an arcuate surface configured to be received in the cooperatively configured groove formed in the gland. The configuration of the ring and the groove enable axial rotation and angular deflection of the gland.

8 Claims, 4 Drawing Sheets

COUPLING ASSEMBLY

BACKGROUND OF THE INVENTION

The present invention relates generally to coupling devices, and more particularly to such devices for joining components in piping systems.

Fluid piping systems typically include components, such as valves, hydrants, tee's, elbows, etc., which are adapted to be adjoined to piping or other components. These components may include any of several types of joint connections, e.g., mechanical joint ("MJ"), flange, or push-on fittings.

Pipelines and piping systems ire subject to the effects of settling, unstable soils, expansion and contraction due to weather and other underground movement; thus, it will be appreciated by those skilled in the art that it is desirable to have a coupling assembly for connecting the components in a piping system in a manner which creates a flexible joint. To this end, there have been several attempts to design a coupling or connecting device to effect such connections.

One such device that is known in the art and referred to as an "anchor coupling" or "swivel coupling" comprises a short length of pipe with means at the ends of the pipe for enabling connection to MJ fittings. One of the drawbacks associated with the anchor coupling is that it provides joint restraint, but virtually no angular deflection when installed. Furthermore, in order to install an anchor coupling, the conduits or fittings to be connected must be in almost perfect alignment. Finally, the anchor coupling may only be used to connect MJ fittings.

Another device known in the art for use in restrained joints is a "hydrant tee" or "anchor tee", which is similar to the anchor coupling in principle and is subject to the same limitations.

Yet another device known in the art and disclosed in U.S. Pat. No. 5,335,946, issued to Dent et al. and incorporated by reference as if fully set forth herein, is a cooperating combination of a gland and a grip ring installed in restrained sealed bolted joints of fluid piping systems. The Dent et al. device comprises a cooperating combination of a metallic gland and a metallic grip ring for use in positioning, compressing and sealing a gasket about a plastic or metallic pipe. The grip ring includes two spaced apart large teeth and several spaced apart, smaller pipe-gripping circumferential teeth located between and beyond the large teeth. When the installed grip ring is restraining a pipe, the teeth penetrate the pipe to provide complete circumferential restraint.

However, one drawback associated with the grip ring device is that it must be actively engaged by the operator, i.e., the T-bolts on the gland must be tightened in order to cause the grip ring to engage. Further, the grip ring provides a poor connection to out-of-round pipe. Also, the grip ring permanently scores the surface of the pipe; therefore, the scored portion of the pipe must be cut off before the pipe may be reused. Finally, the grip ring is designed to connect fittings to pipe. Thus, a short piece of pipe must be cut and two grip ring assemblies installed—one at either end of the pipe—to connect two fittings together.

Another device found in the art is a retainer gland, such as that manufactured by Ford Meter Box Company, Inc. and sold under the trade name "Uni-Flange". The retainer gland essentially provides a friction fit and includes wedges which engage the pipe upon tightening of a bolt. As with the grip rings, the retainer gland is susceptible to interference from dirt on the pipe or the pipe-engaging surfaces of the wedges. Also like the grip rings, the retainer gland is designed to connect fittings to pipe and, thus, requires a short length of pipe with two retainer gland assemblies to connect valves, hydrants or other fittings. Further, the retainer gland provides for less angular deflection; thus, the fittings and/or pipe to be connected must be almost perfectly aligned. The retainer gland does not provide one hundred percent (100%) restraint contact. Moreover, the retainer gland requires critical torquing of the wedge bolts.

Another device found in the art for restrained connections is a flexible ball joint, such as that manufactured by EBAA Iron Sales, Inc. and sold under the trade name "Flex 900". The flexible ball joint provides fitting-to-fitting connection and is intended for use in applications in which a pipeline and components are subject to unusual movement, such as connections to a pump station or pipelines crossing unstable terrain. The ball joint allows for a minimum of fifteen degrees of angular deflection and may be used with MJ, flange and push-on fittings. One of the drawbacks associated with this device is that it offers angular deflection from a center pivot only rather than from two independent pivot points adjacent the connected fittings. This single-point deflection is not ideal for aligning fittings and/or pipes for connection. Another drawback is that this connector is not field adaptable to different types of fitting connections. Thus, a connector of this type configured for attachment to a flange fitting cannot be converted in the field to connect to an MJ fitting. Rather, the joint must be retrofitted with a new connector having ends configured for attachment to an MJ fitting.

Another device found in the art for restrained connections is a connector formed from two ball joints, such as the device sold under the trade name "Flex-Tend". This connector comprises an expansion joint with ball joints at each end. The ball joint design allows for substantial movement of pipes and/or fittings; however, pipes and/or fittings are rarely misaligned to the degree required to connect to the double ball joint configuration. Furthermore, the expansion and contraction of the expansion joint requires additional anchoring of the pipeline.

What is needed then, is a coupling assembly for connecting components of a piping system which is adaptable to different types of joint connections and which enables axial rotation and critical angular deflection of mechanical joint connections.

SUMMARY OF THE INVENTION

The present invention comprises a coupling assembly for connecting pipe and other components of a piping system, such as valves, hydrants, tees, elbows, etc., to form water-tight mechanically restrained joints. The coupling assembly comprises a conduit with an annular ring and a gland mounted at spaced apart ends of the conduit. The gland comprises a pair of arcuate or "C"-shaped segments, each having a groove formed along an inner surface. Accordingly, the grooves formed in each segment are aligned to form one continuous groove when the two segments are attached. The groove is configured to receive the annular ring, which includes a shoulder and an arcuate surface for enabling angular deflection of the gland when installed.

The coupling assembly may be configured to anchor a variety of combinations of joints, including mechanical joints ("MJ"), flanged joints, push-on joints and restraint gasket joints. Thus, both glands of the coupling assembly may be configured to connect to MJ fittings, flange fittings or push-on fittings. Alternatively, one gland of the coupling assembly may be configured to connect to one type of fitting while another gland is configured to connect to a different type of fitting (e.g. MJ fitting and flange fitting, flange fitting and push-on fitting, etc.).

The coupling assembly of the present invention provides full axial restraint, full axial rotation and angular deflection, which enables the connection of misaligned fittings. Further, unlike grip rings, the coupling assembly provides restraint that is independent of the sealing function.

It is an object of the present invention to provide a coupling assembly for connecting the components in a piping system in a manner that enables angular deflection of the components.

It is another object of the present invention to provide a coupling assembly for connecting the components in a piping system that is adaptable to a variety of fittings, such as MJ, flange and push-on type fittings.

It is another object of the present invention to provide a coupling assembly comprising a conduit and a split gland assembly.

It is yet another object of the present invention to provide a gland assembly comprising first and second connectable segments having a groove formed along an inner surface and configured to receive a cooperatively configured annular ring.

These and other objects, features and advantages shall become apparent after consideration of the description and drawings set forth herein. All such objects, features and advantages are contemplated to be within the scope of the present invention even though not specifically set forth herein.

DESCRIPTION OF THE PREFERRED EMBODIMENT

Figure 1:
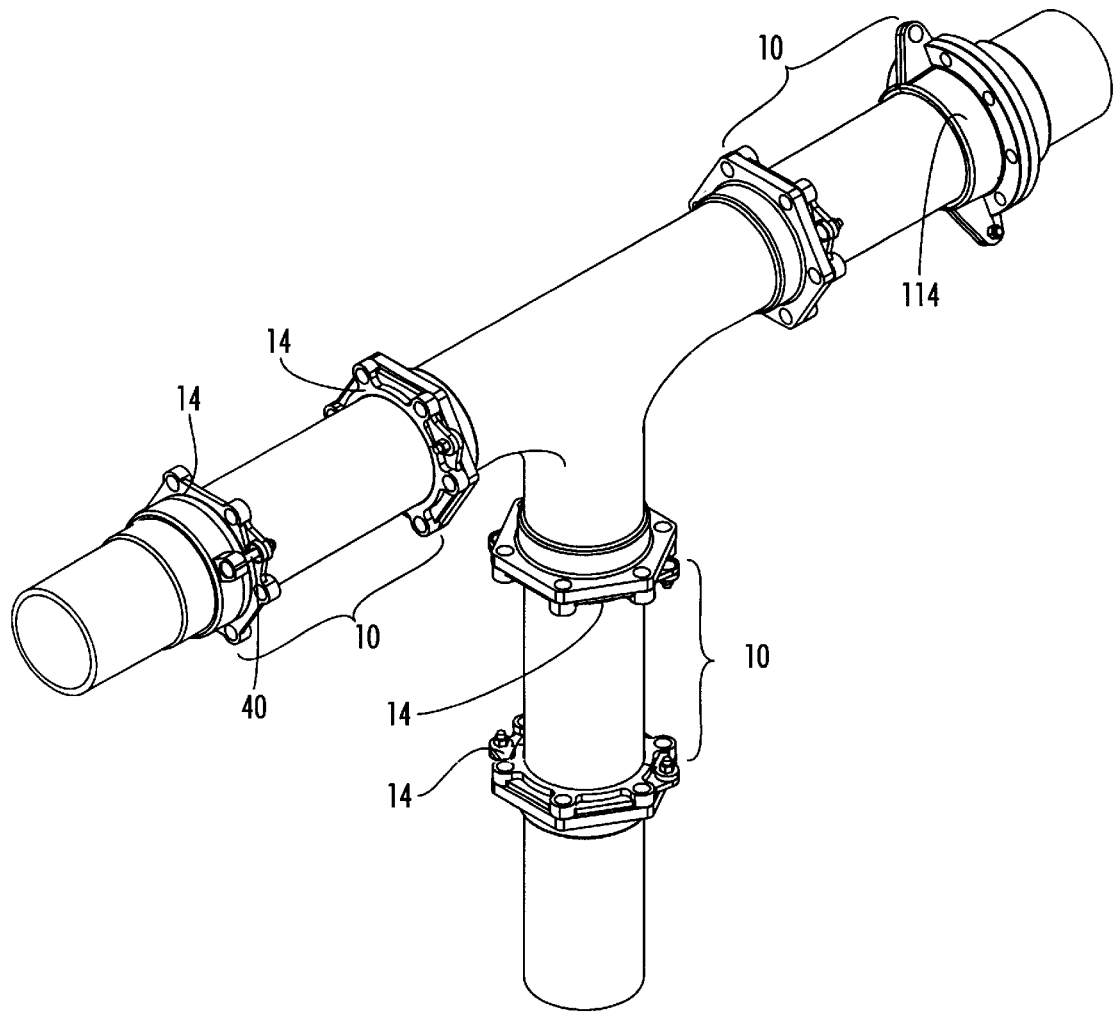
FIG. 1 is a perspective view of a fluid piping system incorporating the coupling assembly of the present invention.
Figure 2:
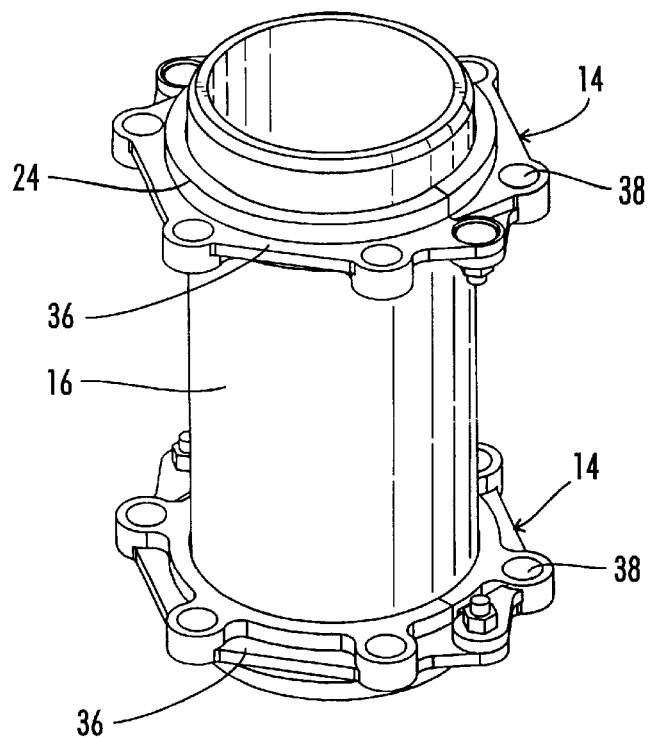
FIG. 2 is a perspective view of an embodiment of the invention with both ends configured for connection to a mechanical joint or a push-on fitting.
Figure 3:
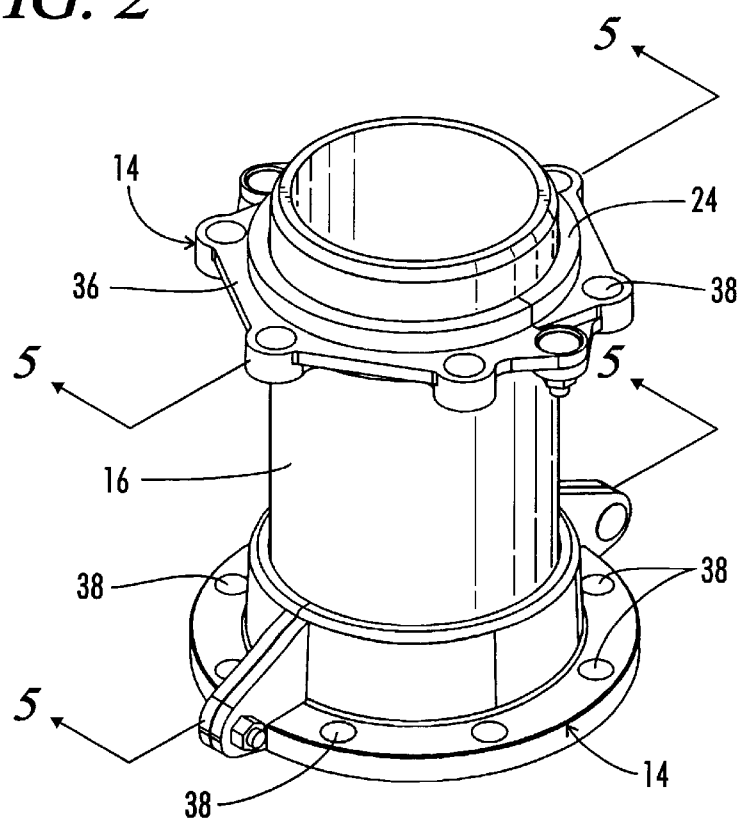
FIG. 3 is a perspective view of an embodiment of the invention with one end configured for connection to a mechanical joint or a push-on fitting, and one end configured for connection to a flange fitting.

With reference to FIG. 1, a piping system incorporating the coupling assembly 10 of the present invention is shown. The coupling assembly 10 may be used to create water-tight mechanically sealed joints between piping and other components in the piping system, such as valves, hydrants, tees, elbows, etc. The piping system includes coupling assemblies 10 configured for attachment to mechanical joints, flange fittings and push-on fittings. In the preferred embodiment, the coupling assembly 10 comprises an annular ring 12 (see FIG. 4A) and a gland 14 operably mounted to a conduit 16 (see FIGS. 2 and 3).

Figure 4A:
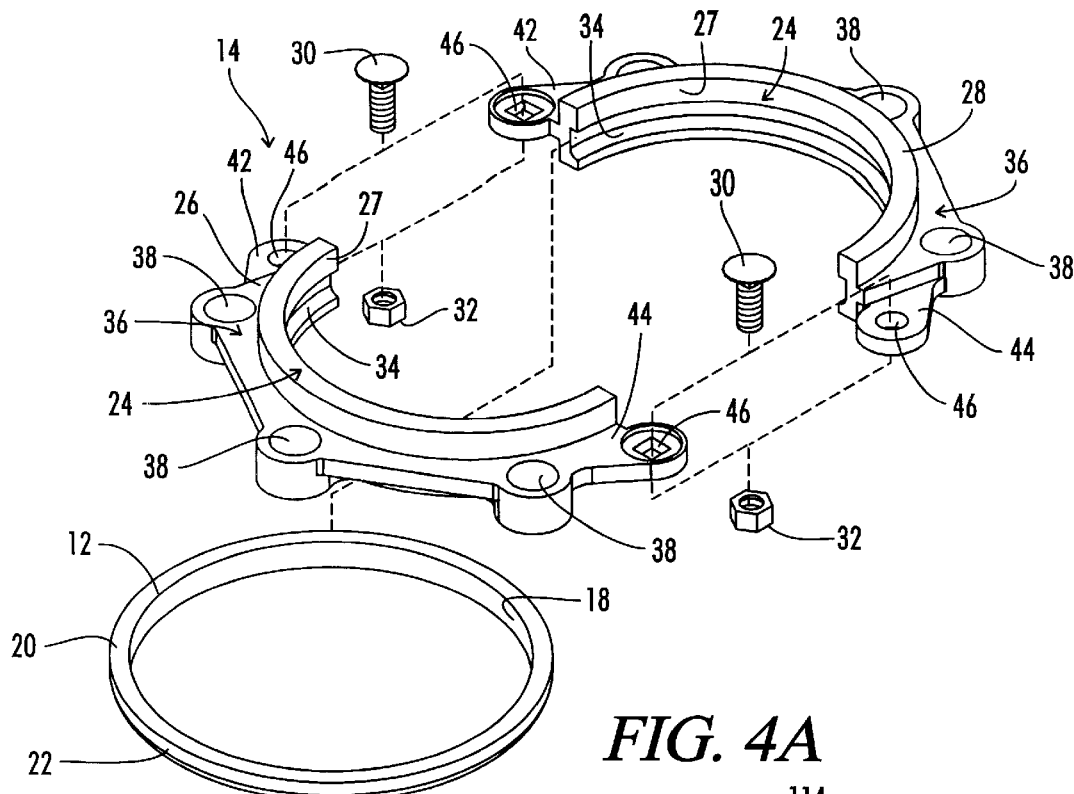
FIG. 4A is an exploded view of an embodiment of the gland of the present invention.
Figure 4B:
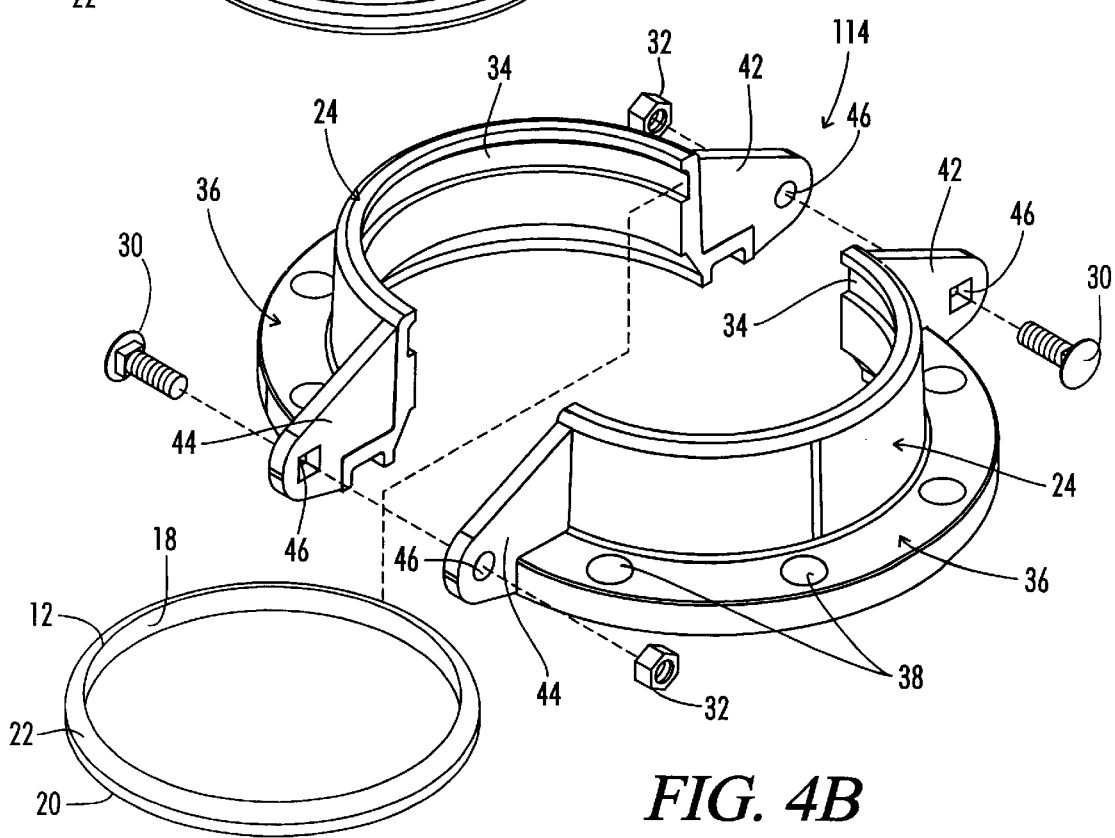
FIG. 4B is an exploded view of an alternate embodiment of the gland of the present invention.
Figure 5:
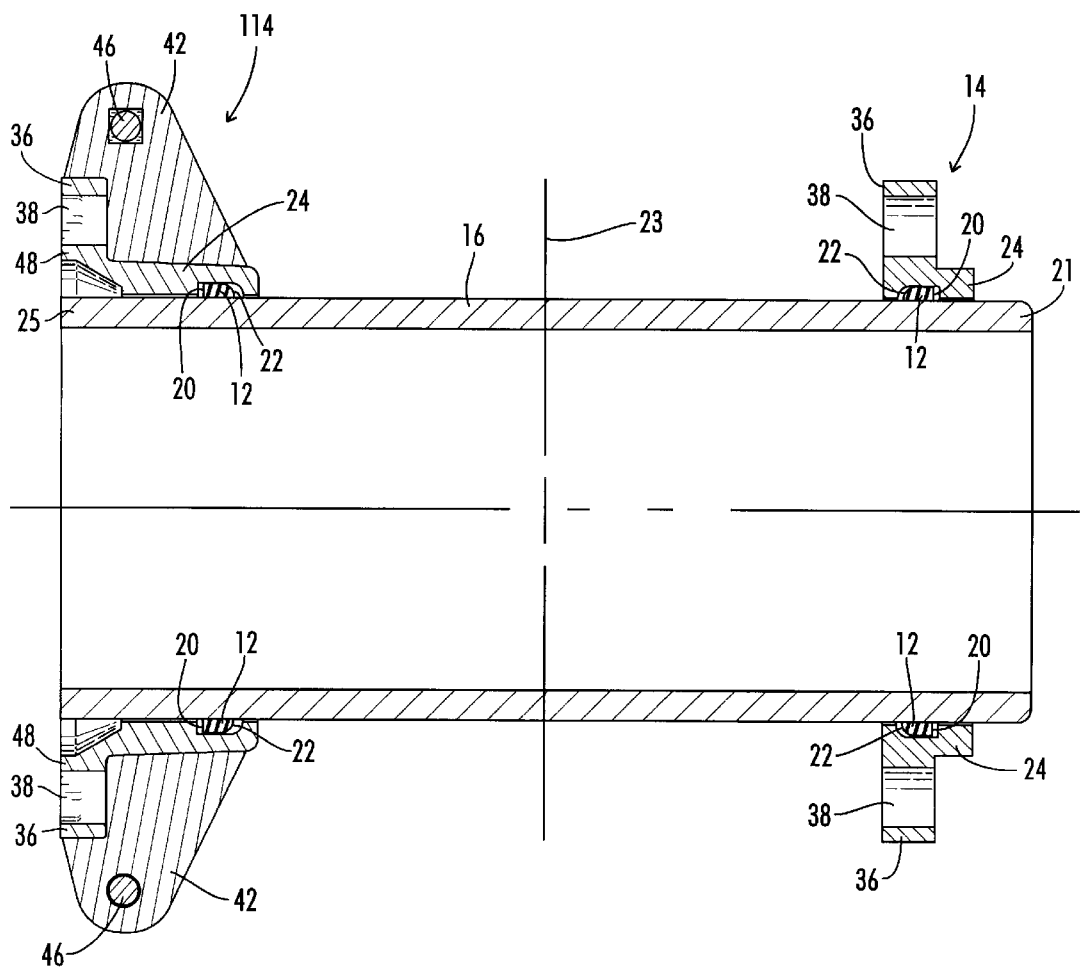
FIG. 5 is a partial sectional view of the present invention showing the cooperating configuration of the ring and inner circumferential groove of the gland.

With reference to FIGS. 4A and 4B, the annular ring 12 is integrally formed on the outer surface of the conduit 16. Alternatively, the annular ring 12 may comprise a separate member configured to surround the outer surface of the conduit 16. In the case of a separate ring member, the ring 12 includes an inner conduit-engaging surface 18, a shoulder 20 and an arcuate surface 22. However, if the ring 12 is integrally formed on the conduit 16, then the conduit-engaging surface merges with the outer surface of the pipe. Each ring 12 is positioned on the conduit 16 such that the shoulder 20 is directed toward either a first end 21 or a second end 25 of the conduit 16 and the arcuate surface 22 is directed toward a midpoint or midline 23 of the conduit 16 (see FIG. 5).

The gland 14 preferably comprises a body 24 formed from first and second arcuate or substantially "C"-shaped segments 26 and 28, which are connectable by fastening means, such as a bolt 30 and nut 32. A circumferential groove 34 is formed along an inner surface 27 of each of the segments 26 and 28. Accordingly, when the two segments 26 and 28 are operably connected, the grooves 34 formed in each of the segments 26 and 28 are aligned to form one continuous annular groove 34 which is configured to cooperatively receive the annular ring 12. Thus, the profile of the ring 12 and the profile of the groove 34 are complementary. The ring 12 and the groove 34 are sized to enable axial rotation and angular deflection of the gland 14 about the ring 12.

In the preferred embodiment, the body 24 of the gland 14 includes an integrally formed flange portion 36 extending radially from an end of the body 24. The side of the flange portion 36 adjacent the terminal end of the body 24 is flush with the end of the body 24, whereas the body 24 extends perpendicularly a distance beyond the opposite side of the flange portion 36. The flange portion 36 includes a plurality of spaced bores 38 for enabling attachment to a fitting with a fastener 40, (as shown in FIG. 4B) such as a bolt. Each of the segments 26 and 28 further includes spaced apart ends 42 and 44, each having a bore 46 formed therein and configured to cooperatively engage the mating end of the other segment when the gland 14 is operably mounted to the conduit 16.

In an embodiment of the gland 14 configured for attachment to a mechanical joint ("MJ") or a push-on fitting, the ends 42 and 44 of one segment of the gland body are configured to overlie the mating ends of the other segment in overlapping engagement. When the segments 26 and 28 of the gland 14 are operably connected to the conduit 16, the spaced bores 38 formed in the flange portion 36 may be aligned with bores on an MJ fitting and attached thereto with a suitable fastener to form a sealed joint.

When used with an MJ type fitting, the gland 14 is positioned on the conduit 16 such that the flush end of the gland 14 is directed toward a midpoint of the conduit 16. Thus, extension of the body 24 on the opposite side of the gland 14 may be inserted into the bell end of the MJ fitting until the flange portion 36 is in flush engagement with the peripheral lip or flange surrounding the bell end of the MJ fitting.

If a sealed connection is desired with a push-on type fitting, the gland 14 is reversed such that the flush end is directed toward the end of the conduit 16. Further, the gland 14 is positioned on the conduit 16 immediately behind (i.e., toward a midpoint of the conduit 16) the annular ring 12. Accordingly, the bores 46 formed at the ends 42 and 44 may be aligned with the standard lugs on a push-on fitting and connected thereto with a fastener, such as a bolt and nut.

In an alternate embodiment of the gland 114 configured for attachment to a flange fitting (as shown in FIG. 1), the ends 42 and 44 are configured to abut the mating ends of the other segment. Further, the flange portion 36 of the gland 114 includes a flat face 48 configured to abut the face of a mating flange fitting. The spaced bores 38 formed in the flange portion 36 may be aligned with bores formed in the flange of the mating fitting and attached thereto with a suitable fastener to form a sealed joint.

Thus, although there have been described particular embodiments of the present invention of a new and useful coupling assembly, it is not intended that such references be construed as limitations upon the scope of this invention except as set forth in the following claims.

What I claim is:

1. A coupling assembly for connecting components of a piping system, comprising:
    a. a conduit;
    b. at least one annular ring disposed about the conduit;
    c. at least one gland having a circumferential groove formed along an inner surface for receiving the annular ring and means for attaching the gland to a mating component, wherein the gland further comprises a body and a flange portion extending radially from an end of the body; and
    d. wherein the ring and the groove are configured to enable axial rotation and annular deflection of the gland.

2. The coupling assembly of claim 1, wherein the flange portion is configured to enable attachment to a flange fitting.

3. The coupling assembly of claim 1, wherein the flange portion is configured to enable attachment to a mechanical joint fitting.

4. The coupling assembly of claim 1, wherein the flange portion is configured to enable attachment to a push-on fitting.

5. A coupling assembly for connecting components of a piping system, comprising:
    a. an annular ring;
    b. a gland having a body and a flange extending radially therefrom,
        wherein the body includes a groove formed along an inner surface for receiving the ring, and the flange includes a plurality of spaced bores for enabling the gland to be attached to a component; and
    c. wherein a profile of the ring and a profile of the groove are cooperatively configured to enable axial rotation and angular deflection of a joint formed when the ring and the gland are operably disposed about a conduit and connected to a component in the piping system.

6. The coupling assembly of claim 5, wherein the gland further comprises:
    first and second mating arcuate segments.

7. The coupling assembly of claim 6, wherein the ends of the first and second segments are configured for cooperative engagement.

8. The coupling assembly of claim 5, wherein the ring further includes a shoulder and an arcuate surface.

* * * * *